John C. Patterson
INVENTOR.

July 30, 1957  J. C. PATTERSON  2,800,878
PORTABLE LIVESTOCK AND POULTRY WATERER HAVING ADJUSTABLE TROUGHS
Filed May 13, 1955  3 Sheets-Sheet 2
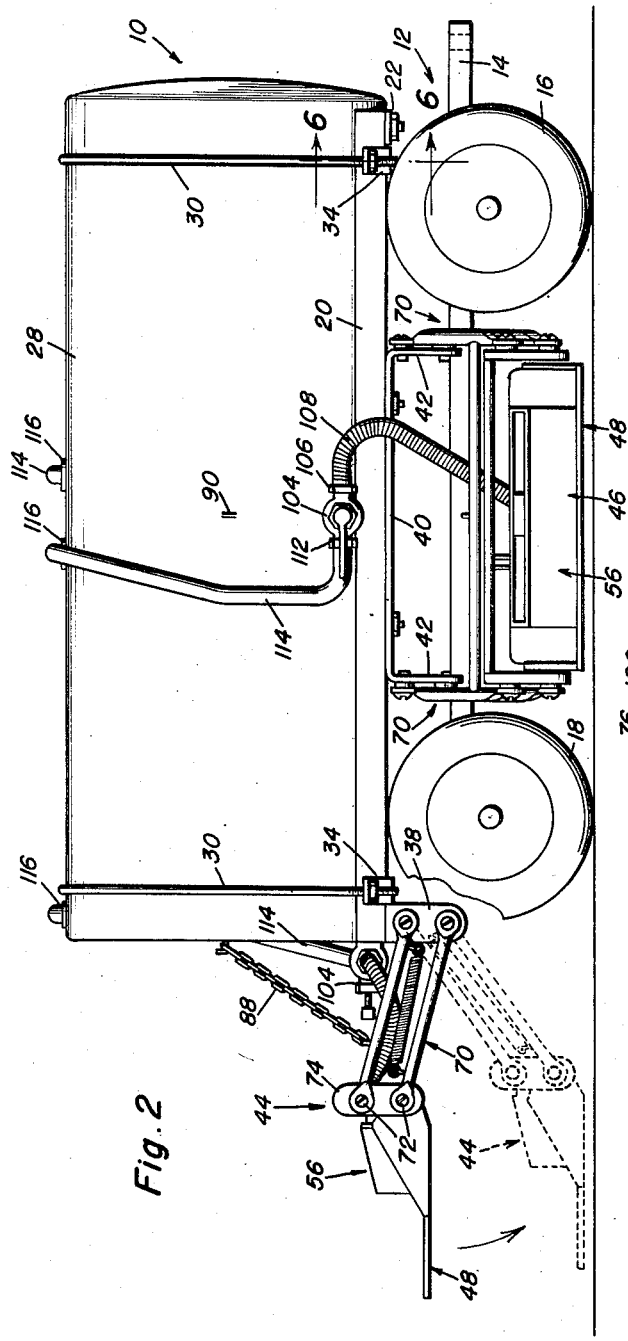
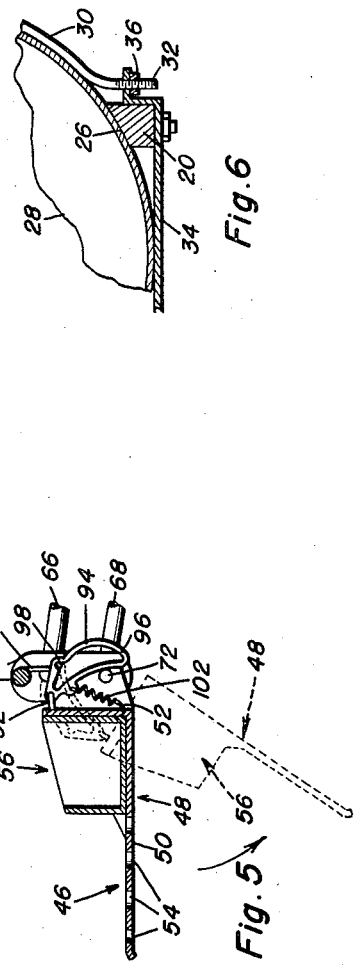
John C. Patterson
INVENTOR.

July 30, 1957   J. C. PATTERSON   2,800,878
PORTABLE LIVESTOCK AND POULTRY WATERER HAVING ADJUSTABLE TROUGHS
Filed May 13, 1955   3 Sheets-Sheet 3

John C. Patterson
INVENTOR.

BY
Attorneys

United States Patent Office 2,800,878
Patented July 30, 1957

2,800,878

PORTABLE LIVESTOCK AND POULTRY WATERER HAVING ADJUSTABLE TROUGHS

John C. Patterson, Winfield, Iowa

Application May 13, 1955, Serial No. 508,080

3 Claims. (Cl. 119—72)

This invention relates in general to new and useful improvements in farm equipment, and more specifically to a stock watering device.

The normal procedure in watering stock and poultry is to place suitable watering troughs in the desired locations. These watering troughs are normally filled as is deemed necessary either from a tank truck or from barrels mounted on a flat bed truck. Inasmuch as the tank truck is normally not in use except when supplying water, it will be readily apparent that this present system is impractical inasmuch as it requires additional transfer of water as well as relatively permanent or stationary watering troughs.

It is therefore the primary object of this invention to provide an improved watering device which includes a water supply tank and at least one watering trough carried by the supply tank, the supply tank and watering trough being portable whereby the watering trough remains attached to the supply tank even though it is necessary to move the supply tank to a water source from time to time.

Another object of this invention is to provide an improved watering device for stock and poultry, the watering device being in the form of a portable supply tank having carried thereby a watering trough, the watering trough being mounted for positioning closely adjacent the ground and being selectively positioned in an elevated position to permit transportation of the portable water tank.

Still another object of this invention is to provide an improved watering trough attachment, the watering trough attachment including suitable linkage support means for selective vertical positioning with the trough being retained in a horizontal plane, the trough being mounted with respect to the linkage for selective pivoting into a vertical plane whereby it may be conveniently flushed.

A further object of this invention is to provide an improved portable waterer for livestock and poultry, the waterer including a water supply tank whereby it may be utilized for dual purposes about a farm, including fire fighting and the like.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 2 is a side elevational view of the waterer of Figure 1 and shows a side watering trough being in lowered position and a rear watering trough in a raised position, the rear watering trough being shown in a lowered position by dotted lines;

Figure 1:
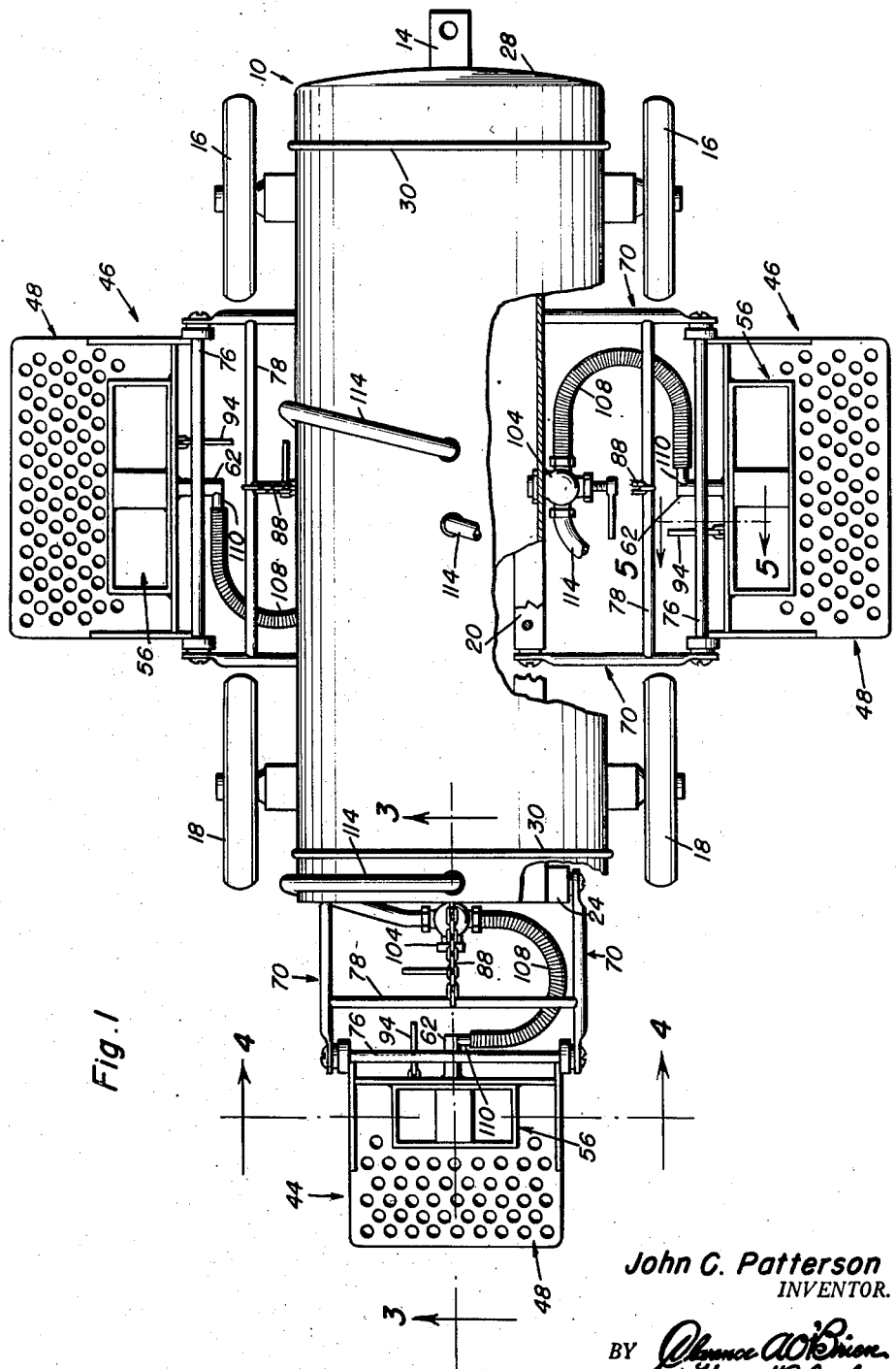
Figure 1 is a top plan view of the portable livestock and poultry waterer which is the subject of this invention and shows the general arrangement of watering troughs carried thereby, an intermediate portion of the supply tank being broken away in order to show the general details of the supporting frame and the connection of a supply hose for the watering trough thereto.

Figure 5 is an enlarged fragmentary vertical sectional view taken substantially upon the plane indicated by the section line 5—5 of Figure 1 and shows the details of the latch mechanism for holding the watering trough in a horizontal position, the watering trough being shown in dotted lines in its released generally vertical position; and Figure 6 is an enlarged fragmentary vertical sectional view taken substantially upon the plane indicated by the section line 6—6 of Figure 2 and shows the manner in which the water supply tank is secured to the wheeled frame on which it is mounted.

Referring now to the drawings in detail, it will be seen that there is illustrated the portable livestock and poultry waterer which is the subject of this invention, the waterer being referred to in general by the reference numeral 10. The waterer 10 includes a wheeled frame which is referred to in general by the reference numeral 12.

The wheeled frame 12 is of a conventional type and includes a drawbar 14 which may be attached to any suitable towing vehicle. Carried by the drawbar 14 in any customary manner are steerable front wheels 16 and rear wheels 18. The wheeled frame 12 also includes a pair of upper longitudinally extending frame rails 20. The forward ends of the frame rails 20 are connected together by a transverse strap 22. The rear ends of the frame rails 20 are connected together by a transverse strap 24.

Referring now to Figure 6 in particular, it will be seen that the upper portion of the frame rails 20 are beveled, as at 26, to permit proper seating of a cylindrical water supply tank 28. The water supply tank 28 extends longitudinally of the wheeled frame 10 and rests directly upon the frame rails 20 with a portion thereof extending down between the frame rails 20 and resting upon the straps 22 and 24. The water supply tank 28 is retained in place by longitudinally spaced hoops 30 having threaded lower end portions 32 passing through outer parts of straps 34 which underlie the frame members 20 and the water supply tank 28. The lower portions 32 of the hoops 30 are threaded and provided with adjustable nuts 36 to properly tension the hoops 30.

The strap 24 is of an inverted channel shape and includes depending ears 38. Substantially identical straps 40 having depending ears 42 are secured to the underside of the frame rails 20 intermediate the wheels 16 and 18, the straps 40 differing from the strap 24 only in their lengths.

Secured to the strap 24 is a stock watering attachment which is referred to in general by the reference numeral 44. Secured to the straps 40 and projecting outwardly from opposite sides of the waterer 10 are stock watering attachments 46. The watering attachments 44 and 46 are identical with the exception that the watering attachment 44 is narrower than the watering attachment 46. In view of this, the watering attachments 44 and 46 will be described simultaneously with like parts being referred to by like reference numerals.

Each of the watering attachments 44 and 46 includes a platform which is referred to in general by the reference numeral 48. The platform 48 includes a horizontal portion 50 and a vertical supporting portion 52. That part of the horizontal portion 50 disposed adjacent the vertical portion 52 is imperforate. However, that part of the horizontal portion 50 disposed remote from the vertical portion 52 is provided with a plurality of perforations 54 to facilitate the drainage of water and the like from the platform 48.

Figure 4:
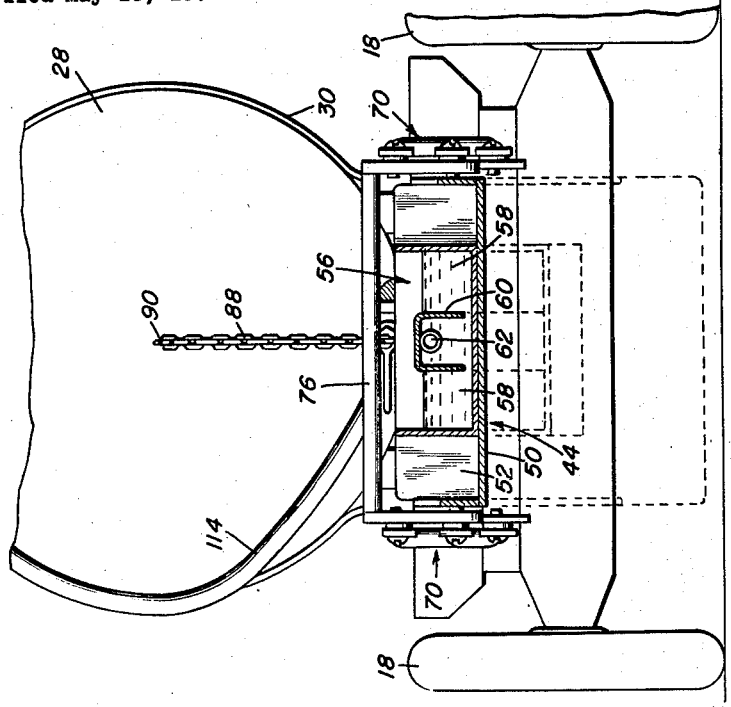
Figure 4 is an enlarged fragmentary transverse vertical sectional view taken substantially upon the plane indicated by the section line 4—4 of Figure 1 and shows the specific details of the compartmentation of the watering trough.
Figure 3:
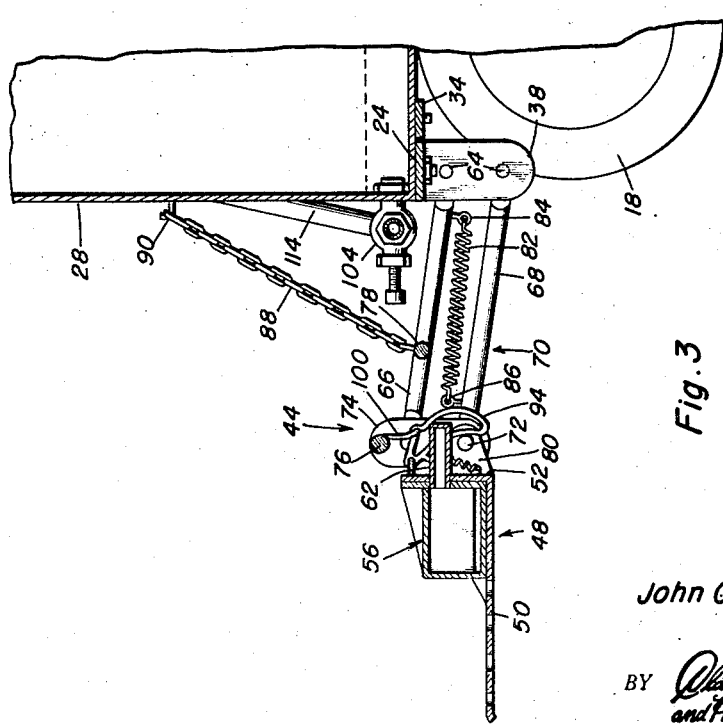
Figure 3 is an enlarged fragmentary longitudinal vertical sectional view taken substantially upon the plane indicated by the section line 3—3 of Figure 1 and shows the specific details of the watering trough including the means for mounting the same with respect to the water supply tank.

Carried by that part of the horizontal portion 50 adjacent the vertical portion 52 is an elongated watering trough 56 which extends transversely of the platform 48. The watering trough 56 is divided into a pair of compartments 58 by an inverted U-shaped housing 60, as is best illustrated in Figure 4. Extending through the housing 60 is a water supply pipe 62. In the particular type of watering trough illustrated, the housing 60 functions as a barometric control for the supplying of water into the watering trough 56. However, other types of controls may be mounted within the housing 60, if desired.

Carried by each ear of the particular strap to which the platform 48 is secured is a pair of vertically spaced pivots 64. Pivotally connected to each pair of pivots 64 are upper and lower links 66 and 68, respectively, of a parallel linkage which is referred to in general by the reference numeral 70. There is attached to each of the ears of the particular strap in question a parallel linkage 70 so that each platform 48 is supported by a pair of parallel linkages. Disposed at the ends of the links 66 and 68 remote from the pivots 64 are upper and lower pivots 72 carried by vertically disposed bars 74. The bars 74 are connected together by a transverse rod 76 which is connected to upper parts of opposed faces of the bars 74. Also, the links 66 are connected together by a transverse rod 78. Thus, a rigid connection is formed between the parallel linkages 70.

Secured to the face of the vertical portion 52 of each platform 48 remote from the horizontal portion 50 at the opposite ends of the vertical portions 52 is a pair of ears 80. The ears 80 are pivotally mounted on the lower pivots of the pivots 72 so that the platform 48 and its associated watering trough 56 may be selectively vertically or horizontally positioned.

In order that the weight of the platform 48 and the watering trough 56 may be substantially counterbalanced, there is provided between each of the links 66 and 68 a tension spring 82. The tension spring 82 has one end thereof connected to an eye bolt 84 carried by the link 66 and the opposite end thereof connected to an eye bolt 86 carried by the link 68.

In order that the platform 48 and the watering trough 56 may be retained in an elevated position, there is carried by the rod 78 intermediate its ends a chain 88. The chain 88 has the upper link thereof selectively positionable over a hook 90 carried by the water supply tank 28.

It is intended that the platform 48 and associated watering trough 56 be normally retained in a horizontal position. In order to accomplish this, there is carried by the vertical portion 52 of the platform 48 a yoke 92 to which there is pivotally connected a latch member 94. The latch member 94 is in the form of a plate having the interior thereof cut away to form a cam surface 96. The cam surface 96 includes an upper notch portion 98. Normally seated in the notch portion 98 is a keeper 100 which depends from the rod 76. Extending between the latch 94 and the vertical portion 52 of the platform 48 is a tension spring 102 which normally so positions the latch member 94 to retain the keeper 100 in the notch 98.

Connected to the water supply tank 28 adjacent each one of the watering attachments 44 and 46 and communicating with the interior of the tank 28 is a supply valve 104. The supply valve 104 is of a two-way type and includes a first leg 106 to which there is connected a flexible conduit 108. The opposite end of the flexible conduit 108 is connected to a connecting portion 110 of the water supply conduit 62.

The valve 104 includes a second limb 112 to which there is connected a filler hose 114. The upper end of the filler hose 114 is connected to the top part of the water supply tank 28 by a suitable fitting 116.

In the operation of the present invention, the waterer 10 is drawn to the desired location by a tractor (not shown) or the like and is set. The desired ones of the watering attachments 44 and 46 are then released and lowered to the dotted line position of Figure 2 with respect to the watering attachment 44 and the solid line position of the watering attachment 46 in the same figure. After this has been accomplished, the valve 104 is moved to a position for supplying the watering troughs 56 with water from the water supply tank 28. When the platforms 48 are in their lowered positions, the watering troughs 56 carried thereby are properly elevated for supplying water to livestock and poultry. Because of the perforations 54 in the platforms 48, the platforms 48 remain substantially dry at all times.

After the supply of water in the water supply tank 28 has been exhausted, or it is desired to move the water supply tank 28 to some other locality for watering stock or poultry, the watering attachments 44 and 46 are elevated and supported by the chains 88. Due to the provision of the springs 82, the watering attachments 44 may be easily raised by one man. It is necessary to elevate the watering attachments 44 and 46 in nearly all cases when the waterer 10 is being transported in order to provide the necessary ground clearance.

When the water supply tank 28 has been emptied, and it is desired to refill the same, this can be accomplished by detaching the lower end of the water supply conduit 108 of one of the watering attachments 44 and 46. This may then be connected to a suitable pressurized water source and the valve 104 to which the particular conduit 108 is attached may be turned so as to communicate the filler hose 114 with the conduit 108. In this manner, the water supply tank 28 may be conveniently filled.

From the foregoing, it will be readily apparent that there has been devised an improved livestock and poultry waterer which is highly portable so as to solve many of the problems about the farm and at the same time, will provide a suitable implement for general use about the farm and for forming a reservoir for fighting forest fires and the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A stock watering device comprising a mobile frame, a water supply tank carried by said mobile frame, a watering trough, a platform, said watering trough being mounted on said platform, parallel linkage means connecting said platform to said frame, a flexible conduit connecting said watering trough to said tank, and means interconnecting said frame and said platform for securing said platform in a desired vertical position.

2. A stock watering device comprising a mobile frame, a water supply tank carried by said mobile frame, a watering trough, a platform, said watering trough being mounted on said platform, parallel linkage means connecting said platform to said frame, a flexible conduit connecting said watering trough to said tank, and means interconnecting said frame and said platform for securing said platform in a desired vertical position, said linkage means including a pivotal support for said platform, and a detachable latch mechanism for releasably retaining said platform in said horizontal positions, said latch mechanism permitting said platform to be vertically disposed for facilitating cleaning of said watering trough.

3. A stock watering device comprising a wheeled frame, a water supply tank carried by said wheeled frame, at least one watering attachment, said watering attachment including a watering trough, a platform, said watering trough being mounted on said platform, linkage means connecting said platform to said frame for retaining said platform in selected vertically adjusted horizontal positions, and a conduit connecting said watering trough to said tank, said linkage means including a pivotal support for said platform, and a detachable latch mechanism for releasably retaining said platform in said horizontal positions, said latch mechanism permitting said platform to be vertically disposed for facilitating cleaning of said watering trough, said linkage means being in the form of parallel links, said platform being in the form of a perforated plate whereby water spilled from the watering trough may pass over the plate and down through the perforations thereof so that the plate is self-cleaning.

References Cited in the file of this patent

UNITED STATES PATENTS

| | | |
|---|---|---|
| 1,245,072 | Wagner | Oct. 30, 1917 |
| 1,258,925 | Miller | Mar. 12, 1918 |
| 2,150,499 | Goltz | Mar. 14, 1939 |
| 2,290,042 | Granville | July 14, 1942 |
| 2,391,224 | Carter | Dec. 18, 1945 |
| 2,517,865 | Gilmour | Aug. 8, 1950 |